(12) United States Patent
Chen

(10) Patent No.: US 9,523,863 B2
(45) Date of Patent: Dec. 20, 2016

(54) LENS ASSEMBLY STRUCTURE OF HALF FRAME SPECTACLE

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 27 days.

(21) Appl. No.: 14/615,754

(22) Filed: Feb. 6, 2015

(65) Prior Publication Data

US 2016/0231587 A1  Aug. 11, 2016

(51) Int. Cl.
  *G02C 5/22* (2006.01)
  *G02C 5/00* (2006.01)
  *G02C 5/10* (2006.01)
  *G02C 1/00* (2006.01)
  *G02C 1/04* (2006.01)

(52) U.S. Cl.
  CPC . *G02C 5/10* (2013.01); *G02C 1/10* (2013.01); *G02C 1/04* (2013.01)

(58) Field of Classification Search
  CPC .............. G02C 1/04; G02C 1/02; G02C 1/06; G02C 5/006; G02C 5/00; G02C 1/08;G02C 7/08; G02C 3/003; G02C 7/16; G02C 5/008; G02C 5/045; G02C 5/10; G02C 5/22; G02C 2200/08; A61F 9/025; A61F 9/029
  USPC ...... 351/106, 41, 105, 107, 108, 109, 86, 83
  See application file for complete search history.

(56) References Cited

U.S. PATENT DOCUMENTS

| | | | |
|---|---|---|---|
| 7,104,646 B2 * | 9/2006 | Yang ..................... | G02C 5/146 351/118 |
| 8,684,518 B2 * | 4/2014 | Gasparetto ............... | G02C 5/22 16/228 |
| 2015/0002805 A1 * | 1/2015 | Chen ....................... | G02C 1/04 351/121 |

* cited by examiner

*Primary Examiner* — Bumsuk Won
*Assistant Examiner* — Henry Duong
(74) *Attorney, Agent, or Firm* — Rosenberg, Klein & Lee

(57) ABSTRACT

A lens assembly structure of half frame spectacle mainly comprises a half frame having at least one lens mounting portion. At least one lens is to be assembled to the corresponding lens mounting portion with its projections fitted into inlay grooves of the lens mounting portion. Two link assembly cavities are respectively provided on both sides of the half frame within which links can be respectively assembled. Each link has a limit hole provided for passing-through of a fastening member. Each temple is pivotally connected to the corresponding link. The lens can be fixed firmly in the half frame and replaced very easily.

4 Claims, 6 Drawing Sheets

LENS ASSEMBLY STRUCTURE OF HALF FRAME SPECTACLE

BACKGROUND OF THE INVENTION

Field of the Invention

The present invention relates to a lens assembly structure of half frame spectacle, more particularly to a lens assembly structure of half frame spectacle in which the lenses can be fixed firmly in the half frame and replaces very easily.

Brief Description of Prior Arts

In conventional half frame spectacle, each lens mounting portion of the lens frame has inlay grooves provided on both sides thereof, and each lens has corresponding projections provided on both sides thereof so as to be engaged with the inlay grooves. This design can facilitate the assembly of the lenses and the lens frame, but it is not so effective to fix the lenses and the lens frame only by the engagement between the projections and the inlay grooves, so that it often happens that the lenses are liable to drop off from the lens frame.

SUMMARY OF THE INVENTION

The main object of this invention is to provide a lens assembly structure of half frame spectacle in which the lenses can be fixed firmly in the half frame and replaced very easily.

In order to achieve above objects, the lens assembly structure of half frame spectacle of the present invention mainly comprises:

a half frame having at least one lens mounting portion formed in half frame shape; the lens mounting portion has inlay grooves provided at both sides thereof; the half frame further has link assembly cavities respectively provided on inner faces at both sides thereof, and the half frame has tap holes respectively provided at locations corresponding to the link assembly cavities and penetrating through the bottoms to the link assembly cavities; first fastening members are respectively engaged in the tap holes;

at least one lens to be assembled to corresponding lens mounting portion; the lens has projections formed at both sides thereof for fitting correspondingly into the inlay grooves provided at both sides of the lens mounting portion; the lens further has notches respectively formed at the side adjacent to the link assembly cavities of the half frame and corresponding to the link assembly cavities, and each notch is located below the projection of that side;

two links respectively disposed in the link assembly cavities at both sides of the half frame, each link has a limit hole penetrating from the top to the bottom thereof for passing-through of a first fastening member; a pair of opposite protrusions is respectively formed on the opposite walls of the limit hole to divide the limit hole into a first limit portion and a second limit portion respectively at the front and rear part of the limit hole, and the first fastening member is locked by the opposite protrusions; each link further has a locating recess formed on the upper side at the front end thereof, and the projection located above the notch of the lens is fitted and positioned into the locating recess; tap holes are provided respectively to pass through links near the rear ends thereof;

two temples, each of which has a link assembly chamber formed on the front inner face thereof for receiving the rear end of the corresponding link; tap holes corresponding to the tap holes near the rear ends of the links are respectively formed to penetrate from the bottom ends of the temples to the link assembly chambers; a second fastening member is used to engaged into the tap holes respectively of the temple and the link of each side.

BRIEF DESCRIPTION OF ACCOMPANYING DRAWINGS

The present invention will be better understood by the detailed description of preferred embodiments with reference to the accompanied drawings, in which.

DETAILED DESCRIPTION OF PREFERRED EMBODIMENTS

The technical contents, objects and effect of the present invention will become more apparent by the detailed description in conjunction with the accompanied drawings.

Figure 1:
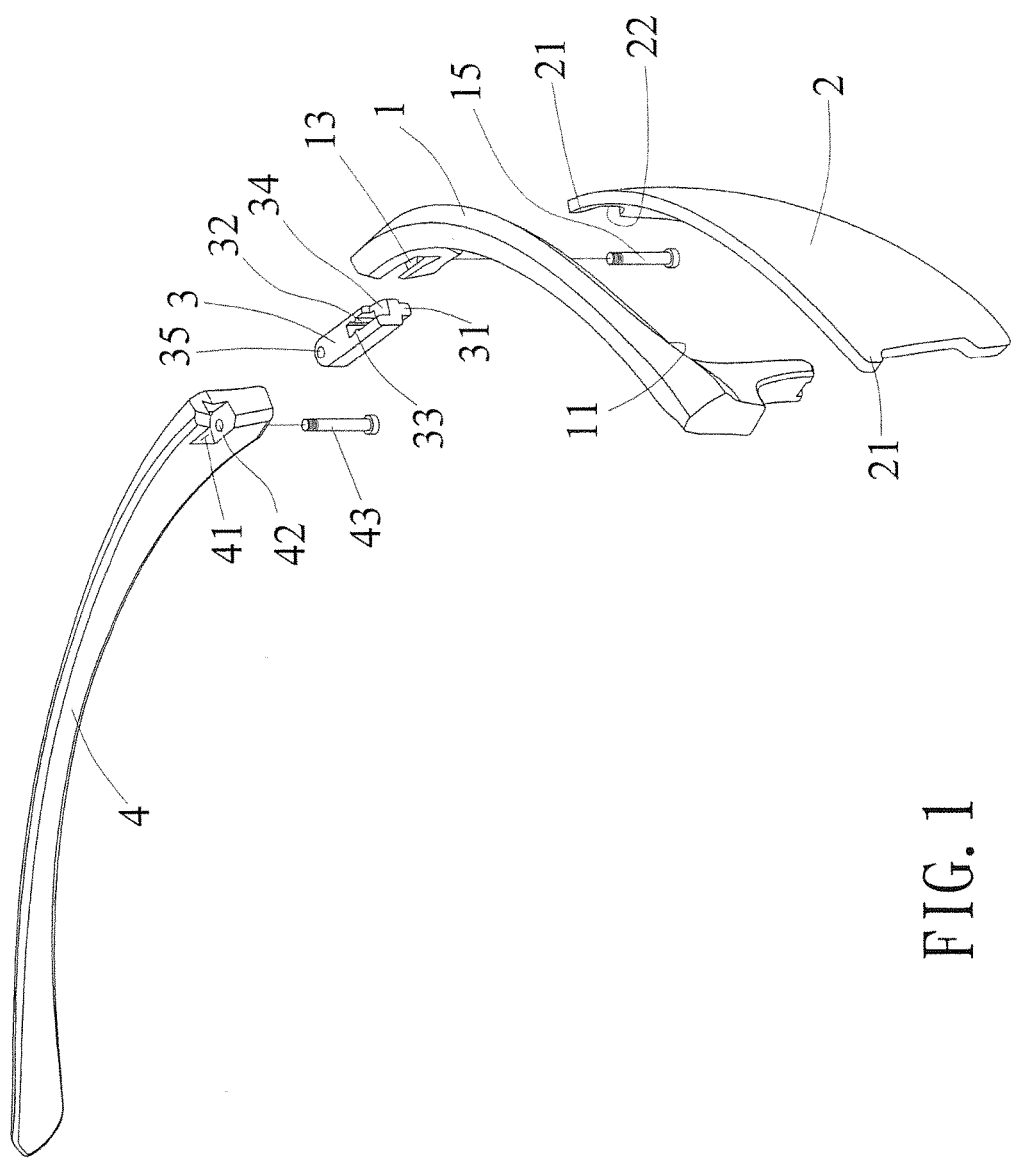
FIG. 1 is a perspective exploded view of the present invention.
Figure 2:
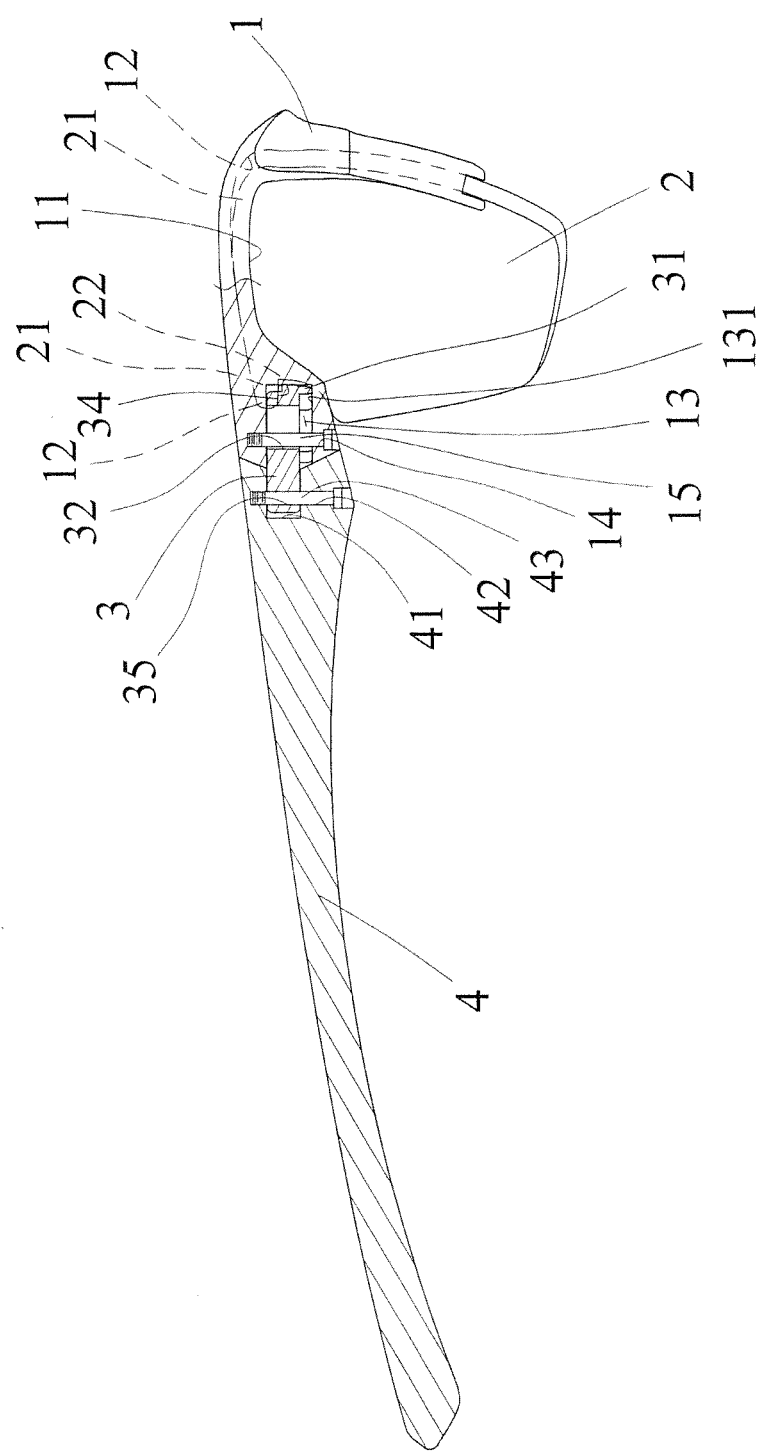
FIG. 2 is a sectional side view of the assembly of the present invention.
Figure 3:
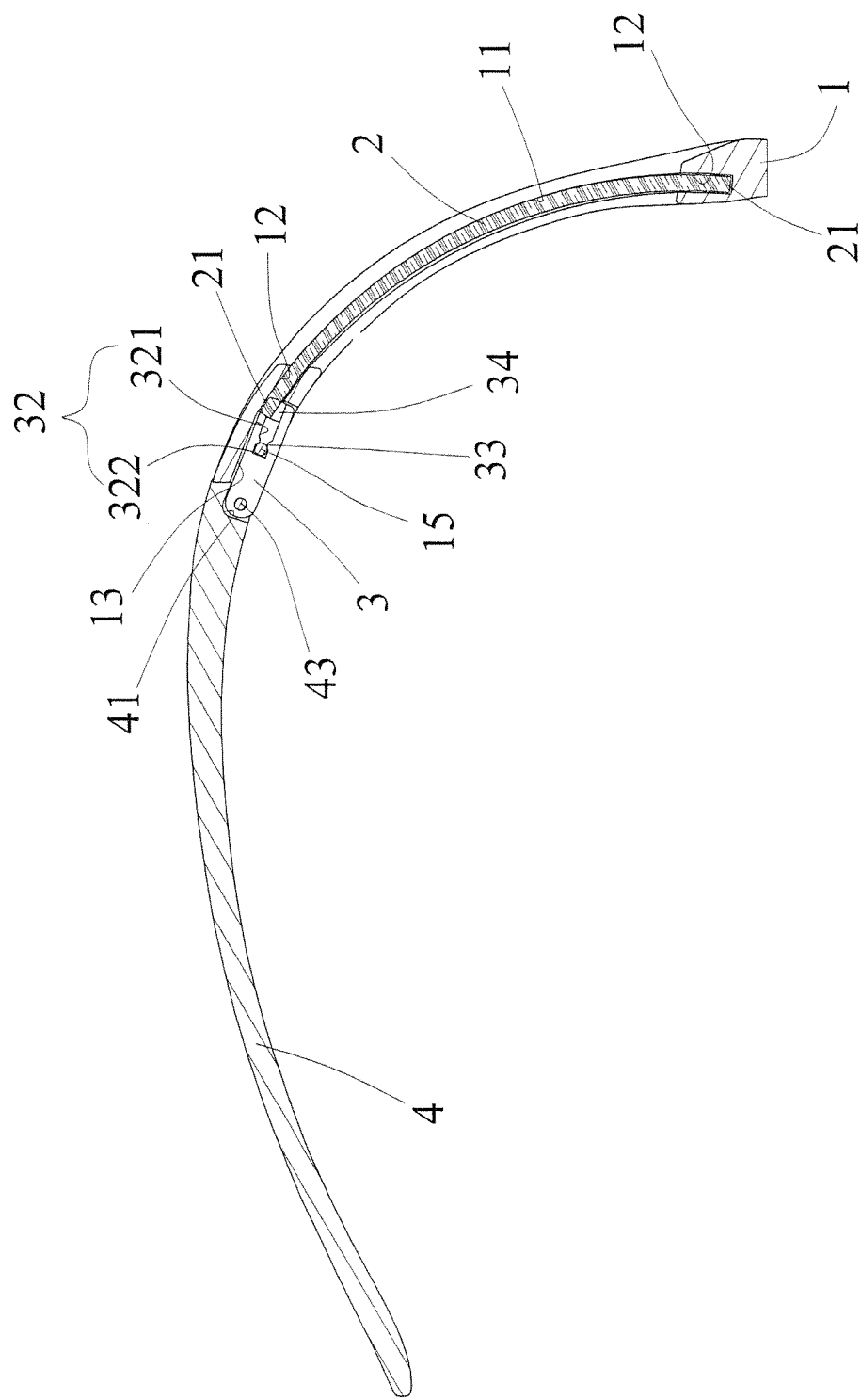
FIG. 3 is a sectional top view of the assembly of the present invention.

Firstly referring to FIGS. 1 to 3, the lens assembly structure of half frame spectacle of the present invention mainly comprises a half frame 1, at least one lens 2, links 3 and temples 4.

The half frame 1 has at least one lens mounting portion 11 formed in half frame shape. According to a preferred embodiment of the present invention, there are two neighboring lens mounting portions 11 provided. The lens mounting portion 11 has inlay grooves 12 provided at both sides thereof. The half frame 1 further has link assembly cavities 13 respectively provided on the inner faces at both sides thereof, and tracks 131 are respectively formed along lengthwise direction on the bottom walls of the link assembly cavities 13. Furthermore, the half frame 1 has tap holes 14 respectively provided at locations corresponding to the link assembly cavities 13 and penetrating through the bottoms to the link assembly cavities 13. Each tap hole 14 is engaged with a first fastening member 15 which can be a screw.

There is at least one lens 2 (in certain embodiment, there is only one lens.) provided to correspond to the lens mounting portion 11. According to a preferred embodiment of the present invention, there are two lenses 2 provided to be assembled correspondingly in the lens mounting portions 11 respectively. Each lens 2 has projections 21 formed on both sides thereof for fitting correspondingly into the inlay grooves 12 provided at both sides of the lens mounting portion 11. Each lens 2 further has a notch 22 formed on the side adjacent to the link assembly cavity 13 of the half frame 1 and corresponding to the link assembly cavity 13, and the notch 22 is located below the projection 21 of that side.

Two links 3 are respectively disposed in the link assembly cavities 13 at both sides of the half frame 1. Each link 3 has a sliding block 31 formed on its bottom side for fitting with the tracks 131 formed in the link assembly cavities 13. Each link 3 further has a limit hole 32 penetrating from the top to the bottom for passing-through of the first fastening member 15. A pair of opposite protrusions 33 is respectively formed on the opposite walls of the limit hole 32 to divide the limit hole 32 into a first limit portion 321 and a second limit portion 322, and the first fastening member 15 is locked by the opposite pr otrusions 33. Each link 3 further has a locating recess 34 formed on the upper side at the front end thereof, and the projection 21 located above the notch 22 of the lens 2 can be fitted and positioned into the locating recess 34. Furthermore, a tap hole 35 is provided near the rear end of each link 3.

Each of the two temples 4 has a link assembly chamber 41 formed on the front inner face thereof for receiving the rear end of the corresponding link 3. A tap hole 42 corresponding to the tap hole 35 at the rear end of the corresponding link 3 is formed to penetrate from the bottom end of the temple 4 to the link assembly chamber 41. A second fastening member 43, which can be a screw, is used to engage into the tap holes 42, 35 of the corresponding temple 4 and the link 3 respectively.

Configuring like this, when in assembly as shown in FIGS. 1 to 3, two links 3 are firstly disposed in the respective link assembly cavities 13 at both sides of the half frame 1 in such a manner that the sliding blocks 31 on the bottoms of the links 3 are fitted respectively in the tracks 131 of the link assembly cavities 13, and that the limit holes 32 of the links 3 are respectively aligned with the tap holes 14 near the link assembly cavities 13. Then, the first fastening members 15 can be engaged through the tap holes 14 of the half frame 1 and through the limit holes 32 of the link 3 and are locked respectively with the half frame 1, so that both links are assembled on the half frame 1 in slidable manner. Next, the rear end of each link 3 is inserted into the link assembly chamber 41 provided at the front end of the corresponding temple 4, and the tap hole 42 provided at the front end of each temple 4 is aligned with the tap hole 35 at the rear end of the corresponding link 3, then each second fastening member 43 is engaged into the tap holes 42, 35 respectively of the corresponding temple 4 and the link 3 so that the temple 4 is connected pivotally to the link 3. In turn, the at least one lens 2 is assembled in the lens mounting portion 11 of the half frame 1 in such a manner that the projections at both sides of the lens 2 are respectively fitted into the inlay grooves 12 provided at both sides of the lens mounting portion 11. Subsequently, each link 3 is moved forward so that the front end of the link 3 is displaced to the notch 22, and the locating recess 34 formed on the upper side at the front end of the link 3 is fitted against the bottom side of the projection 21 above the notch 22 so as to prevent the projection 21 of the lens 2 from displacing downward or even detaching the inlay grooves 12 of the lens mounting portion 11. When the locating recess 34 of each link 3 is fitted against the bottom side of the projection 21 of the lens 2, the first fastening member 15 is displaced to the second limit portion 322 at the rear part of the limit hole 32 and is locked by the opposite protrusions 33, so that the fitting of each link 3 against the projection 21 of the lens 2 can be fixed. In this manner, by means of the design of fitting the links 3 against the projections 21 of the lenses 2, the lenses 2 can be prevented effectively from detaching the lens mounting portions 11 of the half frame 1 under vibration state or pulling by force. Thus, the stability of assembling the lenses 2 and the half frame 1 can be enhanced.

Figure 4:
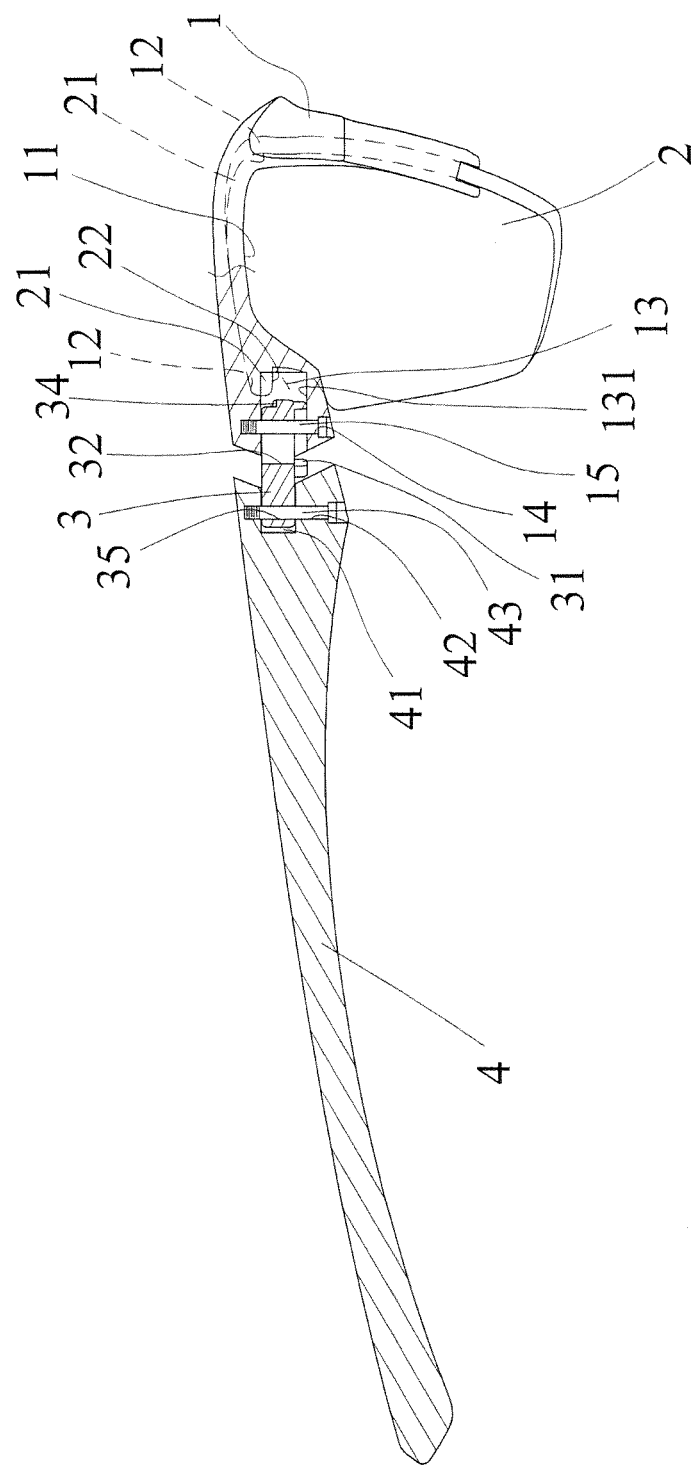
FIG. 4 is a sectional side view of the disassembly of the present invention.
Figure 5:
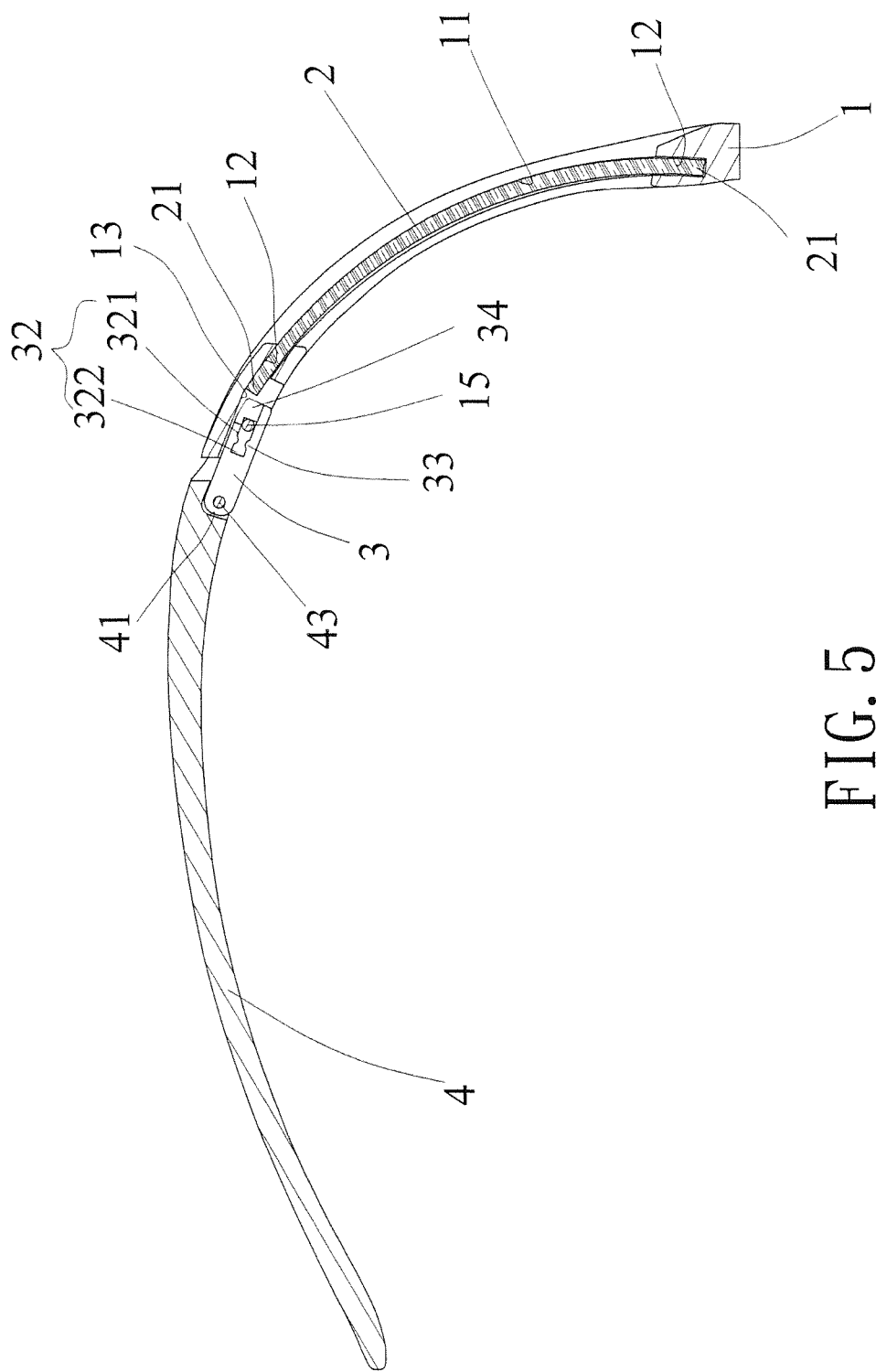
FIG. 5 is a sectional top view of the disassembly of the present invention.
Figure 6:
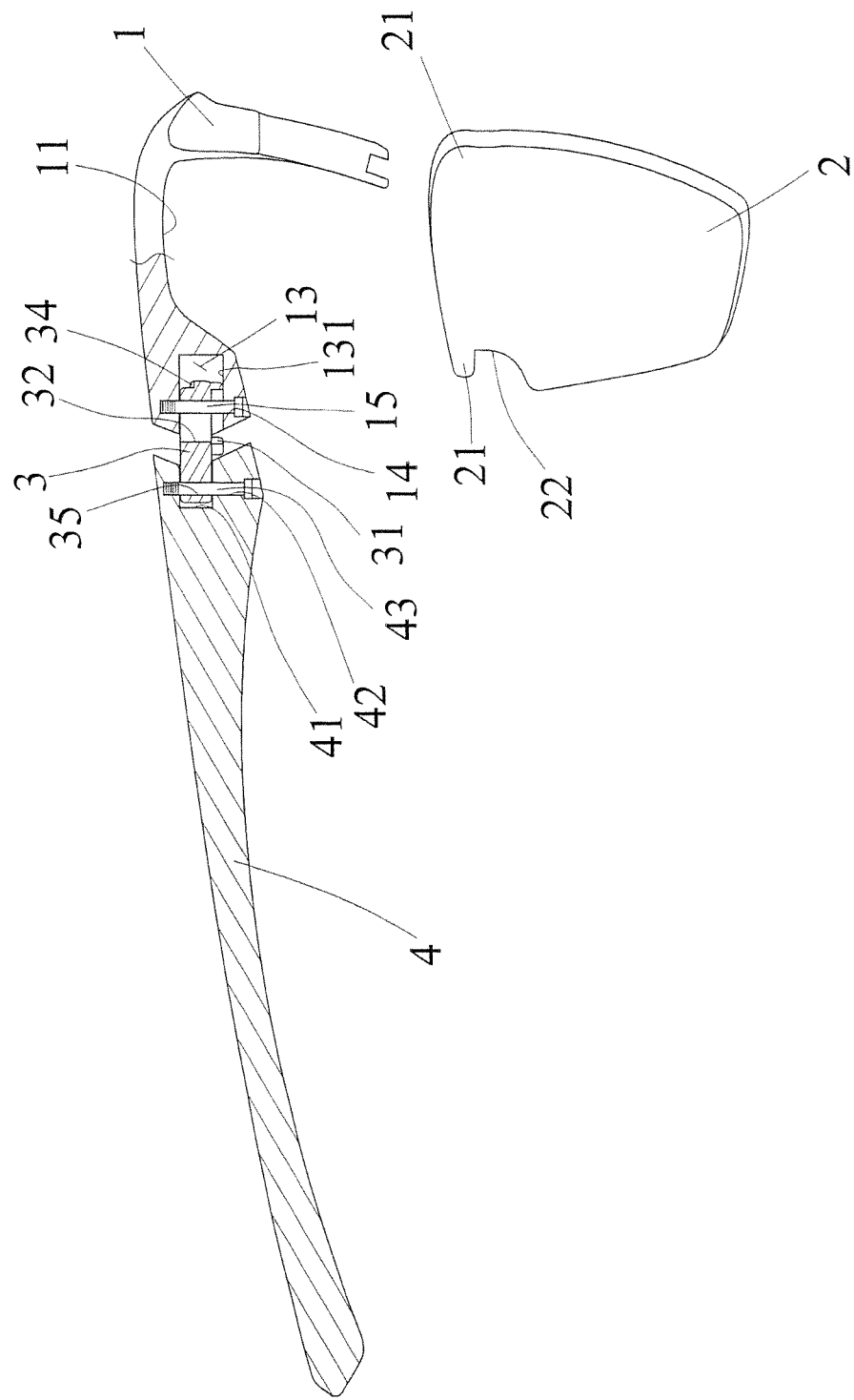
FIG. 6 is a view showing the lens of the present invention in detached state.

If a user detaches the lens 2 from the half frame 1 in order to replace the lens 2, referring to FIGS. 4 and 5, the user just pulls the temple 4 backward to displace the link 3 connected with the temple 4 backward. At this moment, the first fastening member 15 will detach from the locking of the protrusions 33 and move from the second limit portion 322 to the first limit portion 321 at the front part of the limit hole 32, and simultaneously the locating recess 34 is also detached from the abutment against the bottom side of the projection 21 above the notch 22 of the lens 2. In this way, user can apply a force to pull the lens 2 downward so that the projection 21 of the lens 2 is detached from the fitting with the inlay groove 12 of the lens mounting portion 11. Therefore, the lens 2 can be disassembled from the half frame 1 as shown in FIG. 6, and a new lens 2 can be replaced thereby.

What is claimed is:

1. A lens assembly structure of half frame spectacle, comprising:
    a half frame having at least one lens mounting portion formed in half frame shape; the lens mounting portion having inlay grooves provided at both sides thereof; the half frame further having link assembly cavities respectively provided on inner faces at the sides thereof, and the half frame having tap holes respectively provided at locations corresponding to the link assembly cavities and penetrating through the bottom of the half frame to the link assembly cavities; first fastening members respectively engaged in the tap holes;
    at least one lens assembled to the corresponding lens mounting portion; the lens having projections formed on both sides thereof for fitting correspondingly into the inlay grooves provided at both sides of the lens mounting portion; the lens further having notches respectively formed at locations adjacent to the link assembly cavities of the half frame and corresponding to the link assembly cavities, and each notch located below the projection of that side;
    two links respectively disposed in the link assembly cavities at the sides of the half frame; each link having a limit hole penetrating from the top to the bottom of the link for passing-through of the first fastening member; a pair of opposite protrusions respectively formed on the opposite walls of the limit hole to divide the limit hole into a front limit portion and a rear limit portion, and the first fastening member being received in the link to be displaceable between the front and rear limit portions thereof, the first fastening member being releasably locked at each of the front and rear limit portions; each link further having a locating recess formed on the upper side at the front end thereof, and the projection located above the notch of the lens fitted and positioned into the locating recess when the first fastening member is releasably locked in the rear limit portion; a tap hole penetrating through each link near the rear end thereof;
    two temples, each having a link assembly chamber formed on the front inner face thereof for receiving the rear end of the corresponding link; a tap hole corresponding to the tap hole at the rear end of the link formed to penetrate from the bottom end of the temple to the link assembly chamber; a second fastening member engaging the tap holes respectively of the temple and the link.

2. The lens assembly structure of half frame spectacle as claimed in claim 1, wherein the half frame has tracks respectively formed along lengthwise direction on the bottom walls of the link assembly cavities, and sliding blocks corresponding to the tracks of the link assembly cavities are formed on the bottom sides of the links.

3. The lens assembly structure of half frame spectacle as claimed in claim 1, wherein the half frame is provided with two adjacent lens mounting portions, and two lenses are provided to be mounted respectively in the lens mounting portions.

4. The lens assembly structure of half frame spectacle as claimed in claim 1, wherein the link assembly cavities at both sides of the half frame are disposed respectively on the inner faces at both sides of the half frame, and the link assembly chambers at the front ends of the temples are disposed respectively on the inner faces at the front ends of the temples.

\* \* \* \* \*